United States Patent
Laneman et al.

(10) Patent No.: US 10,039,008 B2
(45) Date of Patent: Jul. 31, 2018

(54) METHOD AND APPARATUS FOR WIDEBAND SPECTRUM SENSING

(71) Applicant: University of Notre Dame du Lac, Notre Dame, IN (US)

(72) Inventors: J. Nicholas Laneman, Granger, IN (US); Zhanwei Sun, Mishawaka, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 49 days.

(21) Appl. No.: 14/951,013

(22) Filed: Nov. 24, 2015

(65) Prior Publication Data

US 2016/0150415 A1    May 26, 2016

Related U.S. Application Data

(60) Provisional application No. 62/085,118, filed on Nov. 26, 2014.

(51) Int. Cl.
| | |
|---|---|
| *H04W 16/14* | (2009.01) |
| *H04W 72/04* | (2009.01) |
| *H04L 27/00* | (2006.01) |

(52) U.S. Cl.
CPC ......... *H04W 16/14* (2013.01); *H04L 27/0006* (2013.01)

(58) Field of Classification Search
CPC .................... H04W 16/14; H04L 27/0006
See application file for complete search history.

(56) References Cited

U.S. PATENT DOCUMENTS

| | | | |
|---|---|---|---|
| 8,838,520 B2 | 9/2014 | Laneman et al. | |
| 2002/0193090 A1* | 12/2002 | Sugar | H03D 7/1425 |
| | | | 455/326 |
| 2008/0075215 A1* | 3/2008 | Dong | H04L 7/0058 |
| | | | 375/355 |

(Continued)

OTHER PUBLICATIONS

Ahmad, Bashar I. et al., "Reliable Wideband Multichannel Spectrum Sensing Using Randomized Sampling Schemes," Signal Processing, University of Westminister, Department of Electronics, Communications and Software Engineering, London, UK, available Feb. 16, 2010, pp. 2232-2242.

(Continued)

*Primary Examiner* — Qun Shen
(74) *Attorney, Agent, or Firm* — Knobbe, Martens, Olson & Bear, LLP

(57) ABSTRACT

Examples of wideband spectrum sensing techniques for cognitive radio are provided. The techniques permit undersampling (e.g., sub-Nyquist sampling) the spectrum band, which permits use of more cost effective electronic components (e.g., lower frequency analog-to-digital converters (ADC)). The techniques permit determination of whether there are any (or sufficient) sub-channels that exist in the band to use for transmission, so that only a portion of less than the entire spectrum band is sampled. Detection decisions can be based at least partly on a pair of performance metrics more appropriate for wideband spectrum sensing. These performance metrics are the probability of insufficient spectrum opportunities ($P_{ISO}$) and the probability of excessive interference opportunities ($P_{EIO}$).

10 Claims, 9 Drawing Sheets

(56) References Cited

U.S. PATENT DOCUMENTS

| | | | | |
|---|---|---|---|---|
| 2010/0105332 | A1* | 4/2010 | McHenry | H04W 16/14 455/62 |
| 2011/0123192 | A1* | 5/2011 | Rosenthal | H03M 1/121 398/43 |
| 2012/0250748 | A1* | 10/2012 | Nguyen | G01S 13/0209 375/224 |
| 2014/0192918 | A1* | 7/2014 | Park | H04B 7/0486 375/267 |
| 2014/0241190 | A1* | 8/2014 | Park | H04B 7/0639 370/252 |
| 2015/0146826 | A1* | 5/2015 | Katabi | H04L 27/265 375/340 |
| 2016/0277091 | A1* | 9/2016 | Kim | H04B 7/065 |

OTHER PUBLICATIONS

Ahmad, Bashar I. et al., "Wideband Spectrum Sensing Technique Based on Random Sampling on Grid: Achieving Lower Sampling Rates," Digital Signal Processing, vol. 21, Issue 3, May 2011, pp. 466-476.

Ariananda, Dyonisius et al., "Compressive Wideband Power Spectrum Estimation," IEEE Transactions on Signal Processing, vol. 60, No. 9, Sep. 9, 2012, pp. 4775-4789.

Ariananda, Dyonisius et al., "Multi-Coset Sampling for Powering Spectrum Blind Sensing," IEEE, Jul. 2011, 8 pages.

Baraniuk, Richard, "Compressive Sensing," Lecture Notes in IEEE Signal Processing Magazine, Jul. 2007, 9 pages, vol. 24, Rice University, Texas.

Candès, Emmanuel, "The Restricted Isometry Property and Its Implications for Compressed Sensing," ScienceDirect, Applied & Computational Mathematics, California Institute of Technology, Pasadena, California, available Apr. 11, 2008, pp. 589-592

Davenport, Mark A. et al., "Signal Processing with Compressive Measurements," IEEE Journal of Selected Topics in Signal Processing, vol. 4, No. 2, Apr. 2010, pp. 445-460.

Duarte, Marco F. et al., "Distributed Compressed Sensing of Jointly Sparse Signals," Proceedings of the 2005 Asilomar Conference on Signals, Systems, and Computers, Oct. 30-Nov. 2, 2005, 5 pages.

Feng, Ping et al., "Spectrum-Blind Minimum-Rate Sampling and Reconstruction of Multiband Signals," Department of Electrical and Computer Engineering, University of Illinois at Urbana-Champaign, Urbana, IL, May 7-10, 1996, p. 1688-1691.

Fornasier, Massimo et al., "Chapter 6: Compressive Sensing," Handbook of Mathematical Methods in Imaging, Springer Science+Business Media, Jan. 2011, pp. 189-224.

Gaster, M. et al., "Spectral Analysis of Randomly Sampled Signals," J. Inst. Maths Applics, Jan. 1975, pp. 195-216.

Guibène, Wael et al., "A Compressive Sampling Approach for Spectrum Sensing and Terminals Localization in Cognitive Radio Networks," IEEE 17th International Workshop on Computer Aided Modeling and Design of Communication Links and Networks (CAMAD), Mobile Communications Department, EURECOM, Sophia Antipolois, France, Sep. 17-19, 2012, pp. 6-10.

Gwon, Youngjune et al., "Compressive Sensing with Optimal Sparsifying Basis and Applications in Spectrum Sensing," Wireless Networking Symposium, Globecom, Dec. 3-7, 2012, pp. 5386-5391.

Havary-Nassab, V. et al., "Compressive Detection for Wide-Band Spectrum Sensing," IEEE International Conference on Acoustics, Speech and Signal Processing, Mar. 14-19, 2010, pp. 3094-3097.

Herley, Cormac et al., "Minimum Rate Sampling and Reconstruction of Signals with Arbitrary Frequency Support," IEEE Transactions of Information Theory, vol. 45, No. 5, Jul. 1999, pp. 1555-1563.

Lagunas, Eva et al., "Sparse Correlation Matching-Based Spectrum Sensing for Open Spectrum Communications," EURASIP Journal on Advances in Signal Processing, Jan. 31, 2012, 14 pages.

Landau, H.J., "Necessary Density Conditions for Sampling and Interpolation of Certain Entire Functions," Bell Telephone Laboratories, Incorporated, Murray Hill, New Jersey, Mar. 4, 1966, pp. 37-52.

Lomb, N.R., "Least-Squares Frequency Analysis of Unequally Spaced Data," Astrophysics and Space Science 39, May 15, 1975, pp. 447-462.

Masry, Elias, "Poisson Sampling and Spectral Estimation of Continuous-Time Processes," IEEE Transactions of Information Theory, vol. IT-24, No. 2, Mar. 1978, pp. 173-183.

Mishali, Moshe et al., "Blind Multiband Signal Reconstruction: Compressed Sensing for Analog Signals," IEEE Transactions for Signal Processing, vol. 57, No. 3, Mar. 3, 2009, pp. 993-1099.

Mishali, Moshe et al., "From Theory to Practice: Sub-Nyquist Sampling of Sparse Wideband Analog Signals," IEEE Journal of Selected Topics in Signal Processing, vol. 4, No. 2, Apr. 2010, pp. 375-391.

Mishali, Moshe et al., "Wideband Spectrum Sensing at Sub-Nyquist Rates," IEEE Signal Processing Magazine, Jul. 2011, pp. 102-135.

Needell, Deanna et al., "Signal Recovery From Incomplete and Inaccurate Measurements Via Regularized Orthogonal Matching Pursuit," IEEE Journal of Selected Topics in Signal Processing, vol. 4, No. 2, Apr. 2010, pp. 310-316.

Polo, Yvan Lamelas et al., "Compressive Wide-Band Spectrum Sensing," Faculty of Electrical Engineering, Delft University of Technology, The Netherlands, IEEE, Apr. 19-24, 2009, p. 2337-2340.

Rashidi, Moslem, "A Wideband Spectrum Sensing Method for Cogntitive Radio Using Sub-Nyquist Sampling," Digital Signal Processing Workshop and IEEE Signal Processing Education Workshop (DSP/SPE), Jan. 4-7, 2011, pp. 30-35.

Scargle, Jeffrey D., "Studies in Astronomical Time Series Analysis. II. Statistical Aspects of Spectral Analysis of Unevenly Spaced Data," The Astrophysical Journal, Dec. 15, 1982, pp. 835-853.

Scargle, Jeffrey D., "Studies in Astronomical Time Series Analysis. III. Fourier Transforms, Autocorrelation Functions, and Cross-Correlation Functions of Unevenly Spaced Data," The Astrophysical Journal, Aug. 15, 1989, pp. 874-887.

Sun, Hongjian et al., "Wideband Spectrum Sensing with Sub-Nyquist Sampling in Cognitive Radios," IEEE Transactions on Signal Processing, vol. 60, No. 11, Jan. 2012, in 14 pages.

Sun, Zhanwei et al., "Performance Metrics, Sampling Schemes, and Detection Algorithms for Wideband Spectrum Sensing," IEEE Transactions on Signal Processing, vol. 62, No. 19, Oct. 1, 2014, pp. 5107-5118.

Sun, Zhanwei et al., "Sequence Detection Algorithms for PHY-Layer Sensing in Dynamic Spectrum Access Networks," IEEE Journal of Selected Topics in Signal Processing, vol. 5, No. 1, Feb. 2011, p. 97-109.

Sun, Zhanwei, "Performance Metrics, Sampling Schemes, and Detection Algorithms for Wideband Spectrum Sensing," a dissertation submitted to the Graduate Program in Electrical Engineering, University of Notre Dame, Dec. 2013, in 167 pages.

Sun, Zhanwei, and J. Nicholas Laneman. "Sampling schemes and detection algorithms for wideband spectrum sensing," 2014 IEEE International Symposium on Dynamic Spectrum Access Networks (DYSPAN), IEEE, Apr. 2014, pp. 541-552.

Tian, Zhi et al., "Compressed Sensing for Wideband Cognitive Radios," IEEE International Conference on Acoustics, Speech and Signal Processing, Apr. 15-20, 2007, pp. 1357-1360.

Vaidyanathan, Palghat P., "Sparse Sensing With Co-Prime Samples and Arrays," IEEE Transactions on Signal Processing, vol. 59, No. 2, Feb. 2011, p. 573-586.

Venkataramani, Raman et al., "Perfect Reconstruction Formulas and Bounds on Aliasing Error in Sub-Nyquist Nonuniform Sampling of Multiband Signals," IEEE Transactions on Information Theory, vol. 46, No. 6. Sep. 6, 2000, pp. 2173-2183.

Wang, Ying et al., "Distributed Compressive Wide-Band Spectrum Sensing," Information Theory and Applications Workshop, Feb. 8-13, 2009, in 6 pages.

Wang, Yue et al., "Collecting Detection Diversity and Complexity Gains in Cooperative Spectrum Sensing," IEEE Transactions on Wireless Communications, vol. 11, No. 8, Aug. 2012, pp. 2876-2883.

Wikipedia "Cognitive Radio," accessed Nov. 6, 2015 in 8 pages.

(56) References Cited

OTHER PUBLICATIONS

Yedidia, Jonathan S. et al., "Generalized Belief Propagation," Mitsubishi Electric Research Laboratories, Inc., Jun. 2000, in 11 pages.
Yen, J.L., "On Nonuniform Sampling of Bandwidth-Limited Signals," IRE Transactions on Circuit Theory, University of Toronto, Ontario, Canada, May 1, 1956, pp. 251-257.
Yenduri, Praveen K. et al., "Compressive, Collaborative Spectrum Sensing for Wideband Cognitive Rados," International Symposium on Wireless Communication Systems (ISWCS), Aug. 28-31, 2012, pp. 531-535.
Yu, Zhuizhuan et al., "Mixed-Signal Parallel Compressed Sensing and Reception for Congitive Radio," IEEE, Mar. 31 2008-Apr. 4, 2008, pp. 3861-3864.
Zhou, Lei et al., "Wide-band Spectrum Sensing Using Neighbor Orthogonal Matching Pursuit," Department of Electrical and Computer Engineering, Stevens Institute of Technology, Hoboken, NJ, May 21-22, 2012, in 5 pages.
Second Memorandum Opinion and Order in the matter of Unlicensed Operation in the TV Broadcast Bands and Additional Spectrum for Unlicensed Devices Below 900 MHz and in the 3 GHz Band, released Sep. 23, 2010, in 101 pages.

\* cited by examiner

METHOD AND APPARATUS FOR WIDEBAND SPECTRUM SENSING

CROSS-REFERENCE TO RELATED APPLICATIONS

The present application claims the benefit of priority to U.S. Provisional Patent Application No. 62/085,118, filed Nov. 26, 2014, entitled "METHOD AND APPARATUS FOR WIDEBAND SPECTRUM SENSING," which is hereby incorporated by reference herein in its entirety for all it discloses.

BACKGROUND

Field

Embodiments of the disclosure generally relate to the field of dynamic spectrum access in wireless networks, and in particular, to systems, methods, and devices for sub-Nyquist sampling of a wideband radio frequency spectrum for a cognitive radio.

Description of the Related Art

Cognitive radio (CR) is any radio that may change its transmission behavior based on interaction within the radio environment which it operates. Cognitive radios may perform dynamic spectrum access, which is a method of communication between nodes in a wireless network that takes advantage of inefficient use of already used or licensed radio spectrum. Total throughput of information transmitted in a radio spectrum can be increased by allowing certain cognitive radio wireless nodes or secondary radio users to transmit when the traditional or primary radio users of the spectrum are idle. Transmission performed in this manner allows multiple wireless radio networks to use the same radio spectrum, thus increasing the exchange of information, while reducing interference to the traditional radio users' use of the spectrum.

SUMMARY

An embodiment of a spectrum sensing system for identifying a spectrum opportunity in a sparse wideband spectrum is disclosed. The system comprises an antenna configured to receive electromagnetic signals in a spectrum having a bandwidth, B, and a number of channels, M, the bandwidth associated with a Nyquist sampling rate, Nyq; a data converter in communication with the antenna and configured to sample the bandwidth, B, of the spectrum at a sampling rate, Nyq/$\rho$, that is equal to the Nyquist sampling rate, Nyq, divided by a sub-sampling factor, $\rho$, where $\rho$ is an integer greater than one, to provide an integer undersampled signal, the integer undersampled signal comprising a plurality of bins, wherein each bin in the plurality of bins comprises a plurality of $\rho$ aliased channels; and a hardware processor in communication with the data converter. The hardware processor is programmed to: perform ranked channel detection on at least some of the plurality of bins of the integer undersampled signal, the ranked channel detection providing an identification of a bin having a spectrum opportunity, wherein the ranked channel detection is based at least in part on a target operating point that is based at least in part on a probability of excessive interference opportunities and a probability of insufficient spectrum opportunities.

An embodiment of a method for identifying a spectrum opportunity in a sparse wideband spectrum is disclosed. The method is performed under control of a spectrum sensing system comprising computer hardware. The method comprises receiving electromagnetic signals in a spectrum having a bandwidth, B, and a number of channels, M, the bandwidth associated with a Nyquist sampling rate, Nyq; sampling the bandwidth, B, of the spectrum at a sampling rate, Nyq/$\rho$, that is equal to the Nyquist sampling rate, Nyq, divided by a sub-sampling factor, $\rho$, where $\rho$ is an integer greater than one, to provide an integer undersampled signal, the integer undersampled signal comprising a plurality of bins, wherein each bin in the plurality of bins comprises a plurality of $\rho$ aliased channels; performing ranked channel detection on at least some of the plurality of bins of the integer undersampled signal; and identifying, based on the ranked channel detection, a bin from the plurality of bins that has a spectrum opportunity.

An embodiment of a spectrum sensing system for dynamically undersampling a sparse electromagnetic spectrum is disclosed. The system comprises an antenna configured to receive electromagnetic signals in a spectrum having a total bandwidth, B, and a number of channels, M, the total bandwidth associated with a Nyquist sampling rate, Nyq; a sampling system in communication with the antenna, the sampling system capable of sampling the electromagnetic signals in the spectrum at a plurality of different undersampling rates, wherein each of the undersampling rates in the plurality of undersampling rates is less than the Nyquist sampling rate; and a hardware processor in communication with the filter system. The processor is programmed to access an estimate of a sparsity of the spectrum; determine, based at least in part on the sparsity, an undersampling rate; and command the sampling system to sample the electromagnetic signals in the spectrum at the determined undersampling rate to provide an undersampled signal.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 6A is an example of a complex analog signal in the wideband of interest with 10 channels. FIG. 6B illustrates the aliasing effect of integer undersampling. FIG. 6C shows an example of the aliased signal, where each bin is a complete overlap of 2 channels.

Figure 1A:
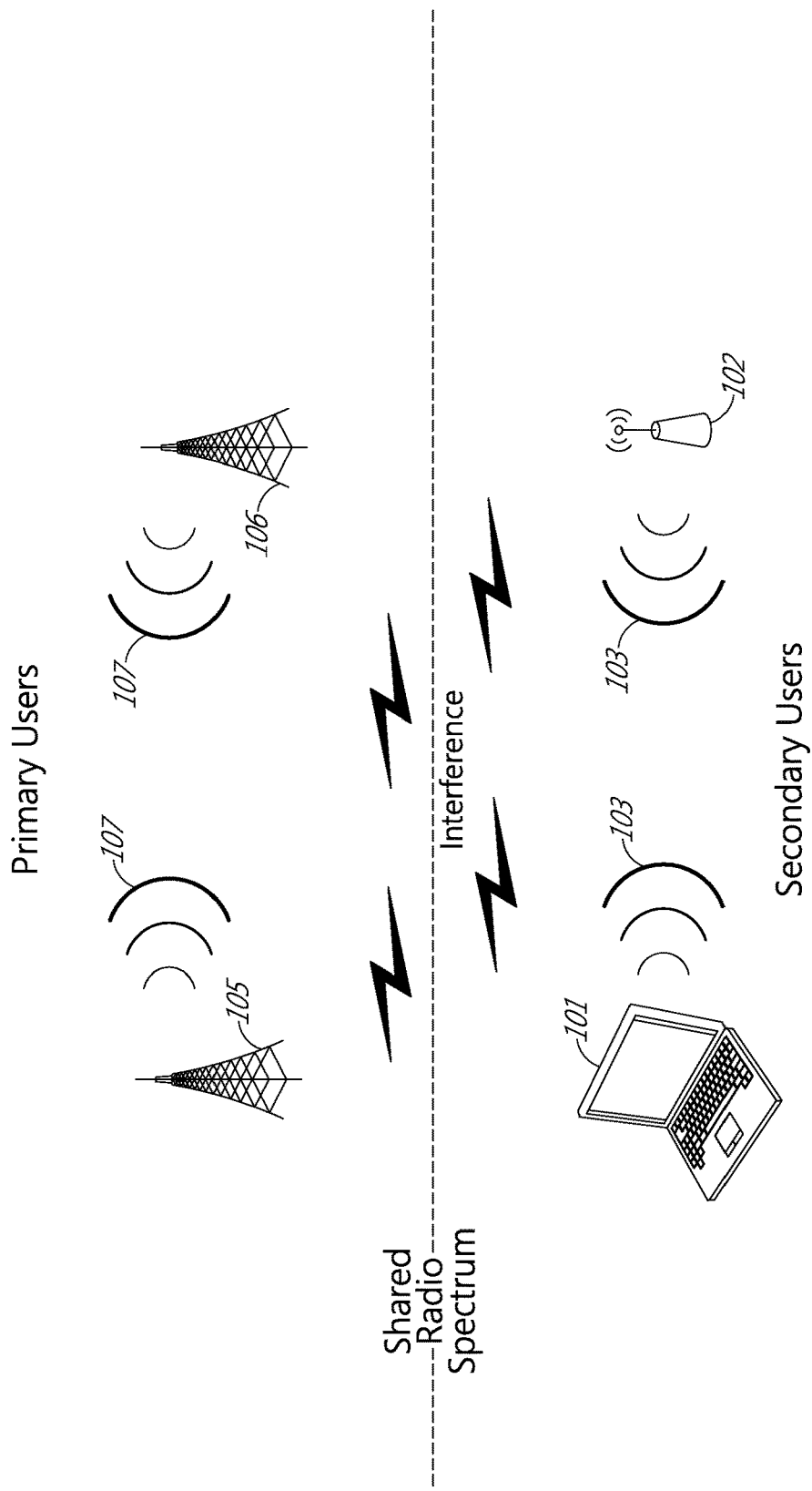
FIG. 1A is a diagram illustrating the relationship between primary users of a radio spectrum and secondary users of the radio spectrum.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Wideband spectrum sensing for cognitive radio can include four elements: system modeling, performance metrics, sampling schemes, and detection algorithms. Each element can potentially be coupled with individual channels and various disclosed designs of wideband spectrum sensing in considering the four elements jointly.

Nyquist sampling at twice the highest frequency in the spectrum band can be impractical for a wideband spectrum, because the Nyquist frequency is too high to be computationally practical. For example, for a 1 GHz wide band, with a center at 0 Hz, and 500 MHz bands on either side, Nyquist sampling at 1 GHz is required. In various implementations described herein, a wideband spectrum can have a bandwidth greater than 50 MHz, greater than 100 MHz, greater than 150 MHz, greater than 250 MHz, greater than 500 MHz, greater than 1 GHz, or more.

The techniques described herein permit undersampling (e.g., sub-Nyquist sampling) the spectrum band, which permits use of more cost effective electronic components (e.g., lower frequency analog-to-digital converters (ADC)). The techniques permit determination of whether there are any (or sufficient) sub-channels that exist in the band to use for transmission, so that only a portion of less than the entire spectrum band is sampled.

The disclosure describes an example of a p-sparse model to characterize the band of channels as a Bernoulli process, and describes a pair of new performance metrics more appropriate for wideband spectrum sensing. These performance metrics are the probability of insufficient spectrum opportunities ($P_{ISO}$) and the probability of excessive interference opportunities ($P_{EIO}$). Two narrower band Nyquist sampling schemes with correspondingly much lower rates than wideband Nyquist rate are described, e.g., partial-band Nyquist sampling and sequential narrow band Nyquist sampling, and a unified sub-Nyquist sampling structure is established. Aliasing patterns inherent in sub-Nyquist sampling are described, two examples, uniform aliasing and periodic aliasing, are disclosed, and corresponding detection algorithms are developed that allow tradeoffs between primary protection and secondary opportunities relevant to the goal of channel detection characterized by the probability of missed detection and the probability of false alarm, as well as the goal of wideband detection characterized by the probability of insufficient spectrum opportunities and the probability of excessive interference. RCD (Ranked Channel Detection) compares channels in the partial-band for channel decisions and can be superior compared to channel-by-channel detection in terms of $P_{ISO}$ and $P_{EIO}$ in some implementations.

For performance metrics that couple individual channels, multi-channel detection algorithms can have an advantage over channel-by-channel detection algorithms even for Nyquist sampling that give independent observations across channels. Integer undersampling, which corresponds to the simplest sub-Nyquist sampling, exhibits improved sensing performance in the regime of better protection for the primary system, for moderate and high signal-to-noise ratio (e.g., SNR>0 dB), and on the other hand, sequential narrow band Nyquist sampling exhibits globally best performance for low SNR (e.g., SNR<0 dB). More sophisticated sub-Nyquist sampling schemes and more advanced sparse reconstruction algorithms may not be needed for wideband spectrum sensing, because their performance is generally inferior to either integer under-sampling or sequential narrow band Nyquist sampling, depending on the system parameters and the detection regime considered.

Cognitive Radio and Dynamic Spectrum Access

Cognitive radio systems may include different tiers of users where some radios have transmission priority over others. These systems may require sensing of radio transmissions, analyzing these transmissions, calculating metrics of spectrum usage, and managing, assigning or otherwise authorizing use of a portion of the spectrum by certain users. In one instance, a transmitting radio may be individually and wholly capable of conducting spectrum sensing, and generating spectrum access metrics necessary for cognitive radio operations. In other instances, a network may be centrally managed by a spectrum access authority where radio transmissions are permitted based on constraints and decisions made at a spectrum access manager.

FIG. 1A is a diagram illustrating the relationship between the primary users of a radio spectrum and the secondary users of a radio spectrum. Primary users 105 and 106 of a radio spectrum are usually licensed users of a radio spectrum, such as the spectrums regulated by the Federal Communications Commission (FCC). Examples of currently regulated spectrum include, but are not limited to, AM/FM radio and television broadcast spectrums. Many primary users do not take into account whether other users of the same spectrum are transmitting before making a decision to transmit. Instead, these types of primary users carry on with transmission of information on various radio spectrums without regard to any other type of users. However, primary users frequently do not constantly transmit on all channels of their regulated radio spectrum either. Thus, there is some idle time when a primary user is not transmitting.

Because of this idle time, it is possible for another set of users to access the licensed radio spectrum when a primary user is not doing so. Secondary users 101 and 102, otherwise known as cognitive radios that perform dynamic spectrum access, may transmit using the same radio spectrum as the primary user for their own purposes. For example, secondary user 101 may be a laptop computer that is wirelessly communicating with a network access point 102. These secondary users may only transmit wirelessly during primary user idle times, otherwise the secondary users' transmission will interfere with the primary user's signal.

Thus, it is advantageous that a secondary user detect, or have a third party detect, when the primary user is transmitting, also known as being in the ON state, and when the primary user is not transmitting, also known as being in the OFF state. This detection is often referred to as spectrum sensing. The secondary user makes a sensing observation by receiving electromagnetic signals in one or more antennas, in one or more locations, for one or more frequency spectrums, repeated over time. These signals are then interpreted as a sensing observation in the ON or OFF state.

One possible method of determining whether a primary user is in an ON state or an OFF state is energy detection. Energy detection is based on the assumption that all radio transmissions, including the primary users' transmissions, have inherent associated energy. The energy can be measured at different radio frequencies across a radio spectrum. After removing the energy associated with out of band noise, an energy detector compares these energy levels to minimum energy level thresholds to determine whether there is enough energy in the primary radio users' spectrum to make the determination that it is the primary radio users' current transmissions that is the cause of the energy. If the energy meets these thresholds or a subset of thresholds, the spectrum is considered occupied by the primary users. However, if the energy thresholds are not met, then the primary users are considered idle and the channel is free. A cognitive radio user can then opportunistically access the spectrum in this channel when the primary user is idle.

Figure 1B:
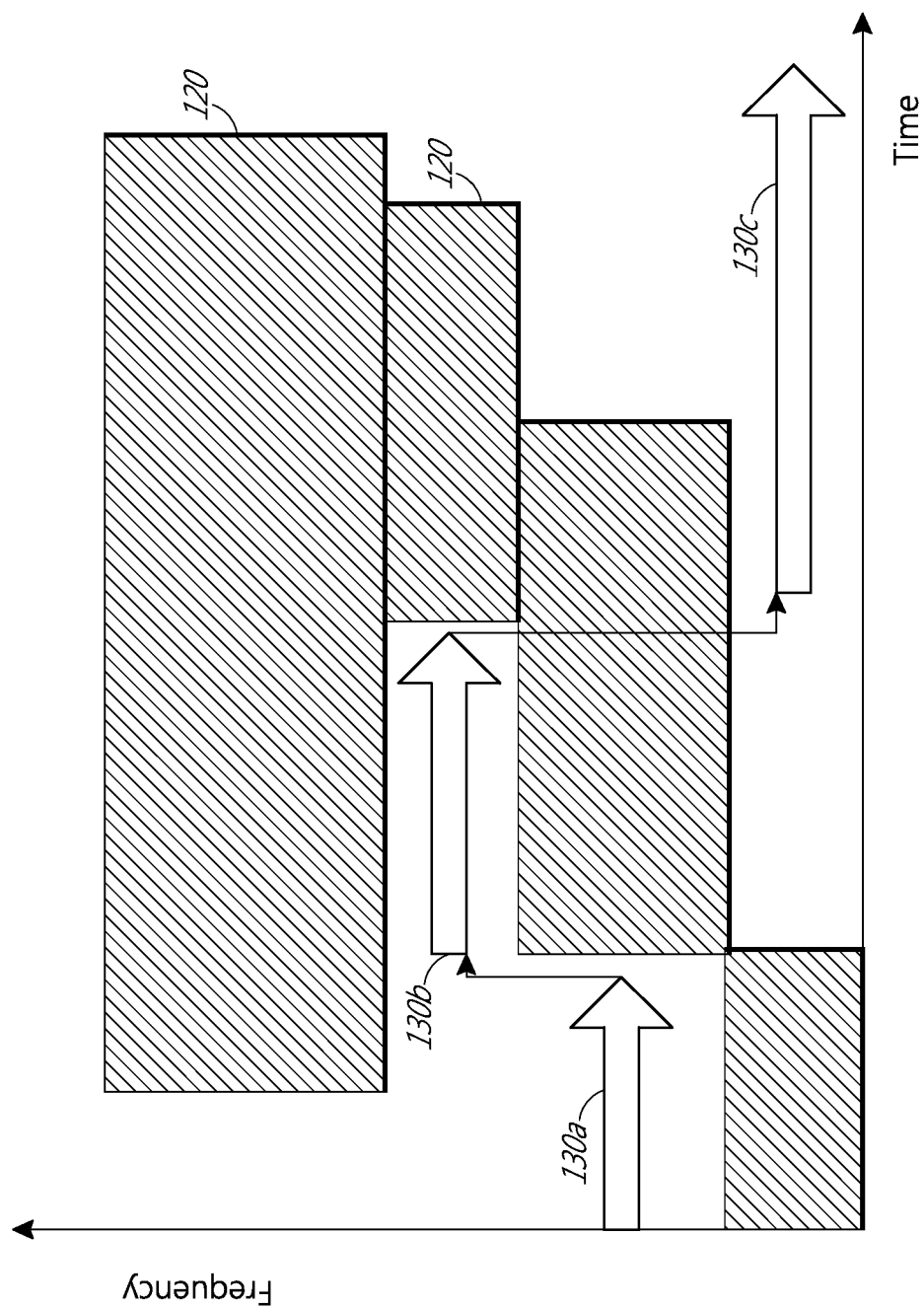
FIG. 1B schematically illustrates an example of utilization of a radio spectrum as function of time and an application of dynamic spectrum allocation by a secondary user.

FIG. 1B schematically illustrates an example of utilization of a frequency spectrum as function of time and an application of dynamic spectrum access by a secondary user. Primary users utilize portions 120 of the spectrum during their ON states (hatched rectangles). Unutilized portions of the spectrum (sometimes called spectrum holes or white space) can be opportunistically used by secondary users to transmit when not in use by a primary user. A secondary user (e.g., a cognitive radio) can broadcast in a first band 130$a$ when not utilized by a primary user. The secondary user can then broadcast in a second band 130$b$ when the first band is used by a primary user and then broadcast in a third band 130$c$, and so forth.

Although FIGS. 1A and 1B and some of the present disclosure are described in terms of a two-tier system of primary and secondary users, this is for illustration and is not a limitation. The techniques of the present disclosure are applicable to any number of tiers of users. For example, the FCC has approved a three-tier Citizens Broadband Radio Service (3.550 GHz-3.700 GHz) having incumbent access users (authorized federal or certain satellite service providers protected from interference from lower tiers), priority access licensed users (who can competitively bid on portions of the spectrum), and general authorized access users who can use any band not assigned to a higher tier and who may opportunistically operate on unused priority access channels. Unless the context indicates otherwise, a secondary user includes a user who can search for and opportunistically use a portion of the spectrum that is unlicensed or unused by a higher tier primary user. For example, a general authorized access user can be a secondary user who opportunistically operates in spectrum unused by primary users: incumbent access users or priority access licensed users.

Figure 2:
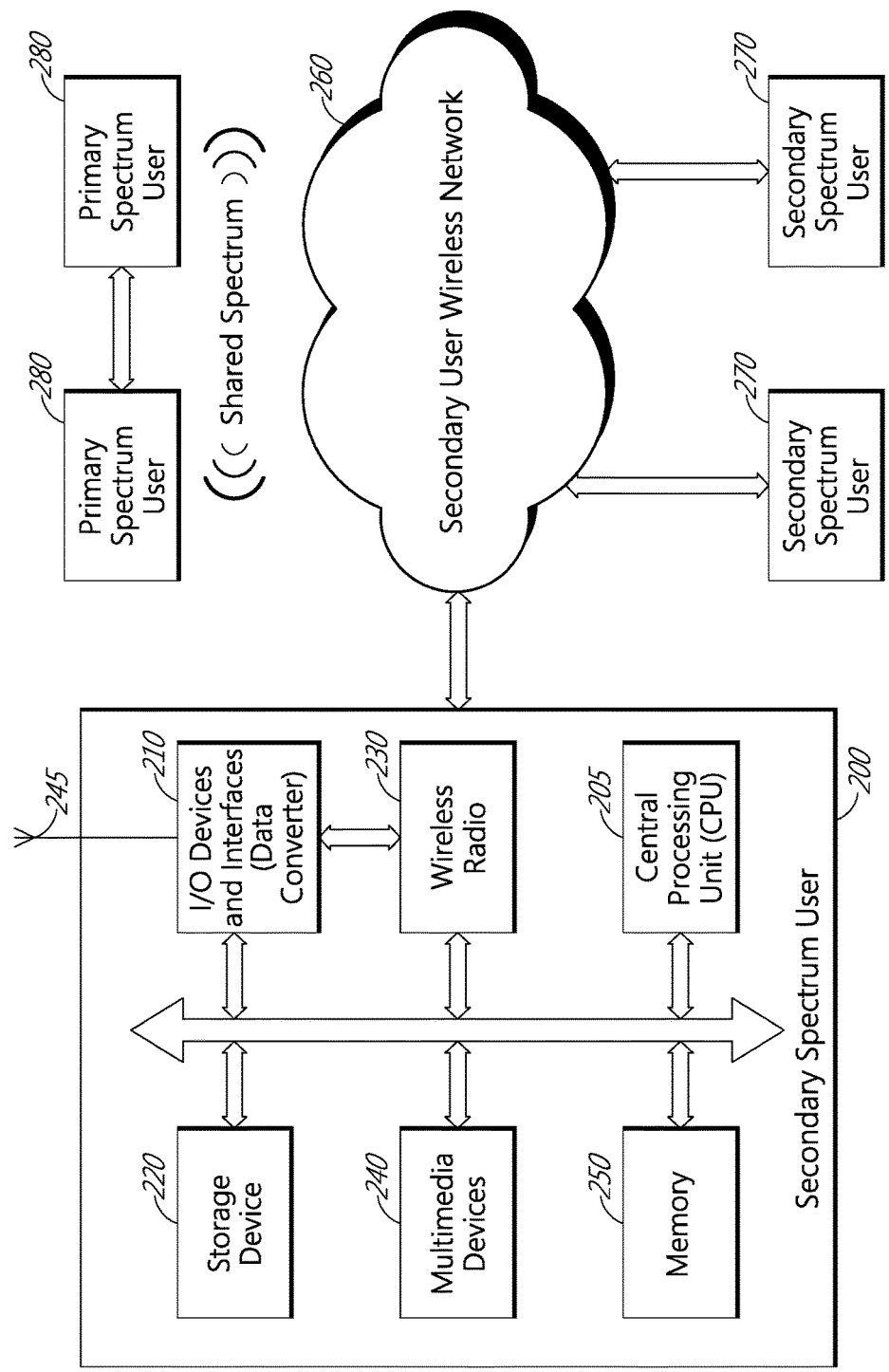
FIG. 2 is a block diagram schematically depicting an example of a hardware system configured to implement embodiments of the wideband spectrum sensing methods described herein.

FIG. 2 is a block diagram schematically depicting an example of a hardware system 200 configured to implement embodiments of the wideband spectrum sensing methods described herein. The system 200 (which can be a fixed system or mobile device) is in communication with one or more other secondary user computing systems 270 and/or secondary user networks 260. The system 200 may be used to implement one or more of the systems, models, and methods described herein. In addition, in one embodiment, the system 200 may be configured to sense (e.g., via antenna 245) primary user 280 radio frequency (RF) transmissions and make a determination whether any primary user 280 is in an ON state and/or determine the sequence of the recent ON/OFF states.

In some embodiments, the system 200 comprises a wireless radio 230 configured to transmit and/or receive RF signals via the antenna 245. The system 200 includes I/O devices and interfaces circuitry 210, which may provide a communications interface to various external devices, radio spectrums, or channels. The I/O devices and interfaces circuitry 210 can also include input devices (e.g., a keypad or a touchpad) and a display to provide visual presentation of data to a user. The I/O devices and interfaces circuitry 210 can also include appropriate data converters such as analog-to-digital (ADC) data converters or digital-to-analog (DAC) data converters. The data converter can be used to sample the signal at an appropriate sampling rate (e.g., to perform sub-Nyquist sampling described below).

The system 200 includes a hardware central processing unit 205 (e.g., a microprocessor or a microcontroller or specialized circuitry) that can be programmed to implement embodiments of the wideband spectrum sensing methods described herein. The system 200 further comprises a memory 250, such as random access memory ("RAM") for temporary storage of information and/or a read only memory ("ROM") for permanent storage of information, and a storage device 220, such as a hard drive, flash drive, or optical media storage device. Typically, the modules of the system 200 are electrically connected using a standards based bus system.

In the embodiment of FIG. 2, the system 200 is coupled to a secondary user network 260, such as one or more of a LAN, WAN, or the Internet, for example, via a wireless communication link. The network 260 communicates with various computing devices and/or other electronic devices via wired or wireless communication links. In FIG. 2, the network 260 is communicating with one or more secondary user computing systems 270 and using the same radio spectrum as primary users 280 during mostly idle periods. Although using the same radio spectrum as the primary users 280 and performing sampling and detection as described herein, in some embodiments the secondary user 200 may communicate with the wireless network and other secondary user devices or systems 270 by running traditional layer 2 protocols under the Open Systems Interconnection (OSI) model on top of its use of the cognitive radio spectrum so as to multiplex secondary user use and provide for channel access control. For example, in some embodiments, once an OFF state sensing decision has been made and sent to sensing decision circuitry, that circuitry may communicate with other secondary users 270 to determine which secondary user node will have access to the spectrum and how the primary user 280 idle spectrum should be utilized. Examples of channel access control mechanisms to be used separately or in combination are FDMA, OFDMA, TDMA, CDMA, SDMA, ALOHA, CSMA/CA, Token Ring, CSMA, schemes used in GSM, and their variations among many others. Duplexing may also occur using any time division or frequency division scheme.

Example Performance Metrics, Sampling Schemes, and Detection Algorithms for Wideband Spectral Sensing One consideration in spectrum allocation, whether static or dynamic, centralized or decentralized, is identifying available spectrum without causing excessive interference that causes unacceptable degradation to incumbent wireless services and devices. Thus databases and spectrum sensing have been identified as functionalities for cognitive radio (CR). In many frequency bands and at many locations across time, the primary occupancy of the spectrum is sparse, e.g., only a small fraction of the spectrum is utilized by its licensed user, often referred to as the primary user (PU), which motivates the use of dynamic spectrum access (DSA) technology. CR and DSA can potentially improve spectrum utilization by allowing an unlicensed user, often referred to as a secondary user (SU), to opportunistically utilize the spectrum if the PU is inactive. The SUs would be restricted by rules that protect the PUs. Thus the SUs can monitor the activities of the PUs in order to reduce or minimize its possible interference to them.

In wideband cognitive radio networks, the SUs advantageously should be capable of sensing multiple frequency bands at a time. Or alternatively a third party, such as a control authority, can perform sensing activities itself or the sensing observation of multiple SUs can be transmitted to and compiled by the control authority. Wideband spectrum sensing usually requires very high sampling rates, which could be practically inhibitive to implement. Wideband spectrum sensing based on sub-Nyquist sampling can have the goal of minimizing the mean-square estimation error (MSE) of the reconstructed primary signals. However, one goal of spectrum sensing for cognitive radio is to find spectrum opportunities for the SUs under certain constraints on primary protection. Low MSE is neither necessary nor sufficient in fulfilling this goal. Some other work uses the traditional detection performance metrics for a single channel, e.g., the probability of missed detection $P_M$, and the probability of false alarm $P_F$, or their average across channels, to characterize the wideband sensing performance. However, the goal of wideband spectrum sensing for cognitive radio can be inherently different from that of single channel sensing. For example, wideband spectrum sensing can tolerate much higher probability of false alarm, since the SUs may not be interested in finding all of the spectrum opportunities. Instead, finding a fraction of them could be sufficient. The detection probability for wideband spectrum sensing can be defined as the probability that all occupied channels are correctly detected, and the false alarm probability for wideband defined as the probability that any of the vacant channels are falsely detected as occupied. Although these performance metrics are tailored for wideband spectrum sensing, they resemble the binary test in single channel sensing and lack the flexibility to find an arbitrary number of spectrum opportunities. Thus, the present disclosure describes two new performance metrics that are meaningful for wideband spectrum sensing.

Another advantage of the present disclosure is the design of new sensing schemes for wideband spectrum sensing that do not require the full wideband Nyquist rate. Some sophisticated, non-uniform sub-Nyquist sampling schemes such as multi-coset sampling (MCS), co-prime sampling (which can be generalized to include two or more sampling branches), and random sampling on a grid (RSG) are possible, in some implementations, uniform sampling can be advantageously used.

The present disclosure describes examples of the following advantages of the disclosed systems and methods: 1) a more natural sparsity model for the primary occupancy status other than the widely used K-sparse model, in which the sparsity level is fixed and often known to the SU a priori; 2) a pair of new performance metrics relevant to wideband, multi-channel detection, specifically, the probability of insufficient spectrum opportunity, $P_{ISO}$, and the probability of excessive interference opportunity, $P_{EIO}$; 3) three new uniform sampling schemes that do not require the wide-band Nyquist sampling rate: Partial-band Nyquist sampling monitors only a fraction of the entire bandwidth with the corresponding Nyquist sampling rate, Sequential narrowband Nyquist sampling breaks the entire bandwidth into several sub-bands and samples each sub-band sequentially in time with the narrowband Nyquist rate, and Integer undersampling, which is the simplest sub-Nyquist sampling scheme, and samples the entire bandwidth uniformly at a sampling rate much lower than the wideband Nyquist rate; and 4) two detection algorithms with performance described in terms of $(P_M, P_F)$ as well as $(P_{ISO}, P_{EIO})$. The results indicate that for performance metrics that couple the individual channels, multi-channel detection algorithms can achieve better performance than channel-by-channel detection algorithms. Moreover, integer undersampling exhibits appealing detection performance in the regime of better protection for the primary system for many scenarios.

Additional details of performance metrics, sampling schemes, and detection algorithms for wideband spectral sensing are provided in U.S. Provisional Patent Application No. 62/085,118, filed Nov. 26, 2014, entitled "METHOD AND APPARATUS FOR WIDEBAND SPECTRUM SENSING" (the '118 Application), which is hereby incorporated by reference herein in its entirety for all it discloses so that it forms a part of this specification.

Example System Model

An overview of an example system model and an example p-sparse model for primary occupancy are described. This section also sets up terminology used in the remainder of this specification.

1) Channelization Model.

The wideband signals of interest are received in a sequence of M consecutive narrow-band frequency channels. Each channel has equal bandwidth $B_0$ and the entire bandwidth is $B=M B_0$. The central frequency of the m-th channel is $f_m$. The primary signals, if present, are subject to additive white Gaussian noise across channels.

2) Primary Occupancy Model.

In this example, no changes in the primary occupancy status occur during a sensing window. This assumption is reasonable as long as the duration of the sensing window is not comparable with that of a primary ON/OFF period. We restrict our discussion to one sensing window with fixed duration of $T_{win}=M\ N\ T_{nyq}$ in time, where $F_{nyq}=1/T_{nyq}=2B$ is the wideband Nyquist sampling frequency and N is the number of wideband Nyquist samples per channel in a sensing window. Thus, the entire sensing window duration for wideband Nyquist sampling is MN. Let $H_m$ denote the primary occupancy status of the m-th channel, with $H_m=1$ and $H_m=0$ corresponding to the PU in the m-th channel being active (ON) and inactive (OFF), respectively.

In the following example, a Bernoulli model is used to characterize the sparse primary occupancies. Specifically, the disclosure models the primary occupancy of channel m by a binary random variable $H_m$, and the wideband primary occupancies of all channels by a vector of independent and identically distributed random variables. The probability that each channel is ON is p, and the primary occupancies across channels are independent. We refer to this model as the p-sparse model and the parameter p as the primary occupancy probability. Define the primary occupancy level K as the number of primary occupied channels, which is a binomial random variable under the p-sparse model. Note that this model is different from the widely used K-sparse model, in which the primary occupancy level is fixed and known to the SU a priori. For example, in the p-sparse model the state of each channel is random and it is unknown to the SU at any given time.

For the SU, aside from knowing the SNR and the fact that the primary occupancy status of the M channels is p-sparse, no further prior information on the PU activities is assumed.

Let $\hat{H}_m$ denote the sensing decision for the m-th channel, i.e., $\hat{H}_m=1$ and $\hat{H}_m=0$ if the SU declares the m-th channel to be ON and OFF, respectively.

Example Sampling Schemes for Wideband Spectrum Sensing

Sampling schemes for wideband spectrum sensing fall into two categories: Nyquist sampling and sub-Nyquist sampling. Nyquist sampling refers to a uniform sampling at a rate equal to or greater than the Nyquist rate, which is twice the highest frequency present in the downconverted signal. In broad terms, sub-Nyquist sampling refers to sampling with overall rate below the Nyquist rate. Sub-Nyquist sampling can be uniform or non-uniform.

For Nyquist sampling, channel-by-channel detection algorithms may be optimal if the performance metrics do not couple the channels, such as $P_M$ and $P_F$ per channel. However, when the spectrum of interest is wide, the rate required for wideband Nyquist sampling (WBNS) could be too high and costly to implement. As a result, sub-Nyquist sampling for wideband spectrum sensing can advantageously be used.

Figure 3:
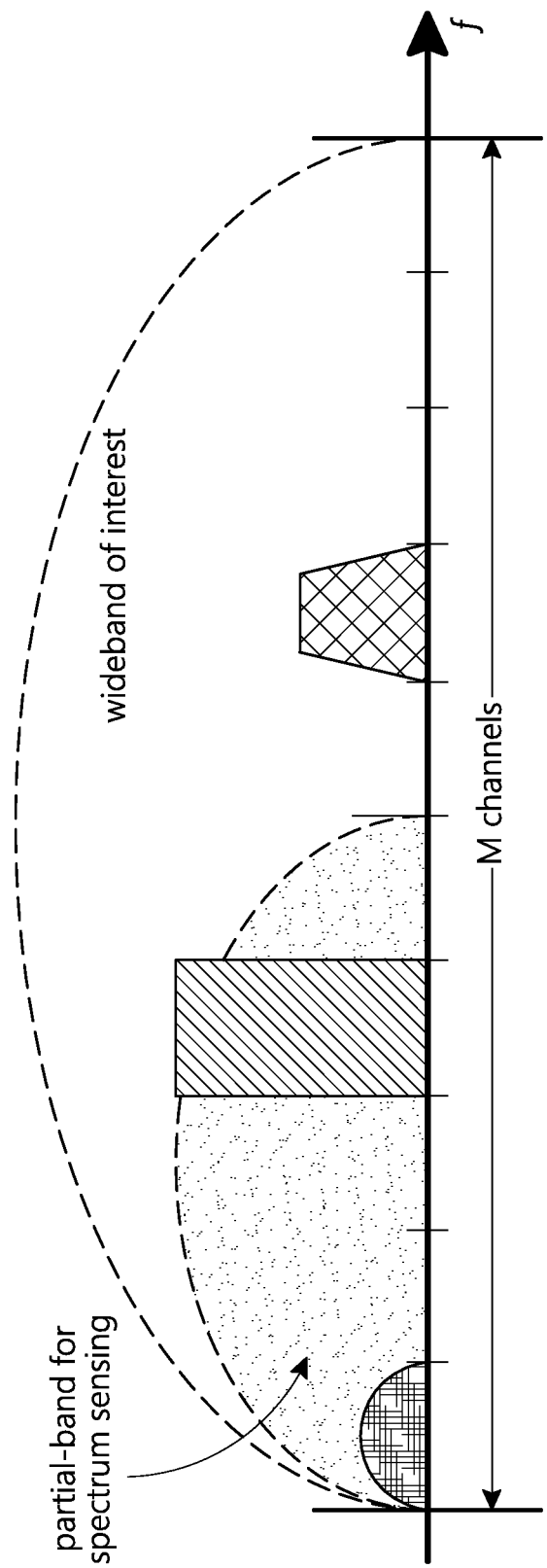
FIG. 3 is a schematic example of partial-band Nyquist sampling (PBNS).
Figure 4A:
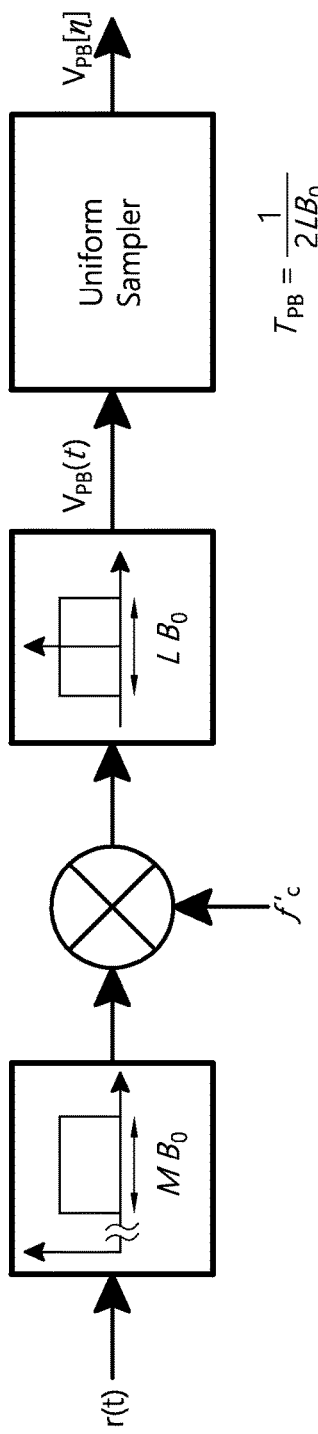
FIGS. 4A and 4B are diagrams schematically illustrating implementations of partial-band Nyquist sampling (FIG. 4A) and integer undersampling (FIG. 4B).

1) Partial-Band Nyquist Sampling:

As discussed earlier, the SU may only be interested in finding several spectrum opportunities rather than finding all spectrum opportunities in a wideband cognitive radio network. This motivates the idea of partial-band Nyquist sampling (PBNS), which samples only a fraction of the entire bandwidth at the corresponding Nyquist rate and ignores the remaining part, as illustrated in FIG. 3. To implement PBNS, an analog bandpass filter with corresponding bandwidth and center frequency, as well as a mixer that down-converts the signal to baseband can be used at the receiver front end before the sampler, as illustrated in FIG. 4A.

PBNS can be characterized by the number of channels in the partial-band. Specifically, PBNS with integer parameter L samples L channels of the entire bandwidth at the corresponding Nyquist sampling rate of $2LB_0$. Since all channels are symmetric in many cases, it makes no difference which part of the spectrum is investigated by the SU. In various implementations of PBNS, L is less than M/2, M/4, M/8, or smaller.

Some advantages of PBNS include the following aspects. First, the sampler is straightforward to implement. It is simply traditional Nyquist sampling over a smaller bandwidth. Second, channel-by-channel detection algorithms, which may be optimal for performance metrics that do not couple the channels, such as $P_M$ and $P_F$, may be much easier to implement and more computationally efficient. One possible disadvantage is that the number of channels PBNS can monitor is limited to L and no a posteriori information for the remaining channels is available.

2) Sequential Narrowband Nyquist Sampling:

One way to monitor all channels while sampling at a much lower rate than $F_{nyq}$ is to divide the entire bandwidth in frequency as well as the entire sensing window in time into several parts, and sense each sub-band sequentially in sub-windows. This approach is referred to as sequential narrowband Nyquist sampling (SNNS). SNNS is characterized by the sub-sampling factor, which is defined as the ratio of the Nyquist rate to the actual sampling rate, e.g., $$\rho = \frac{F_{nyq}}{F_s}.$$

To implement SNNS, the entire bandwidth is split into $\rho$ sub-bands, with each sub-band containing $M/\rho$ channels and a total bandwidth of $B/\rho$. At the receiver front end, $\rho$ analog passband filters, or one analog passband filter along with a tunable mixer, can be used. Narrowband Nyquist sampling can be implemented sequentially in sub-windows for each sub-band, with the entire sensing window $T_{win}$ split into $\rho$ sub-windows. Thus, the number of samples collected for each channel is $N/\rho$.

Compared to PBNS that monitors only a fraction of the wideband in a sensing window, SNNS is able to get some information for all channels. However, this is achieved by providing less information per channel, which then reduces the accuracy of the corresponding sensing result. Another possible disadvantage of SNNS is that it is more complicated to implement than PBNS.

Figure 4B:
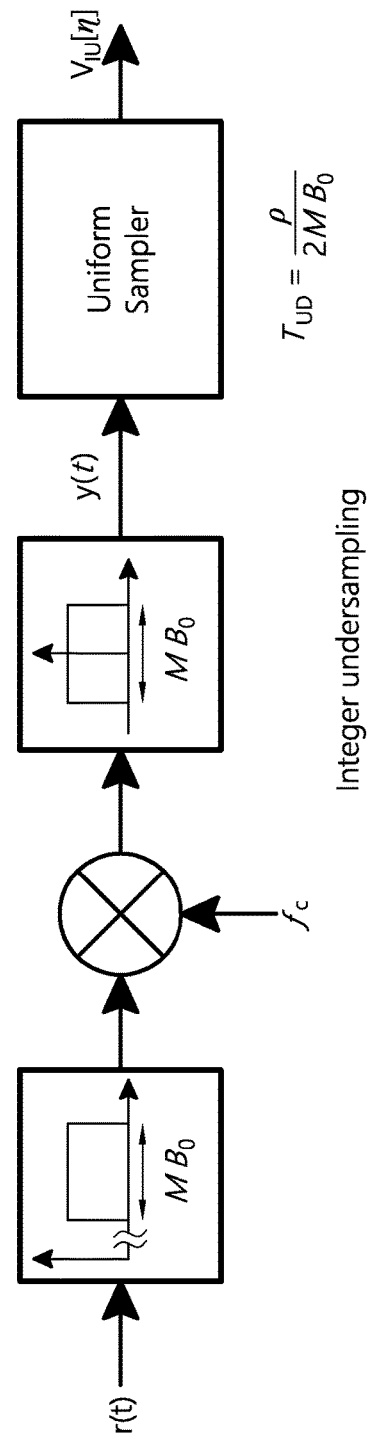
Figure 5B:
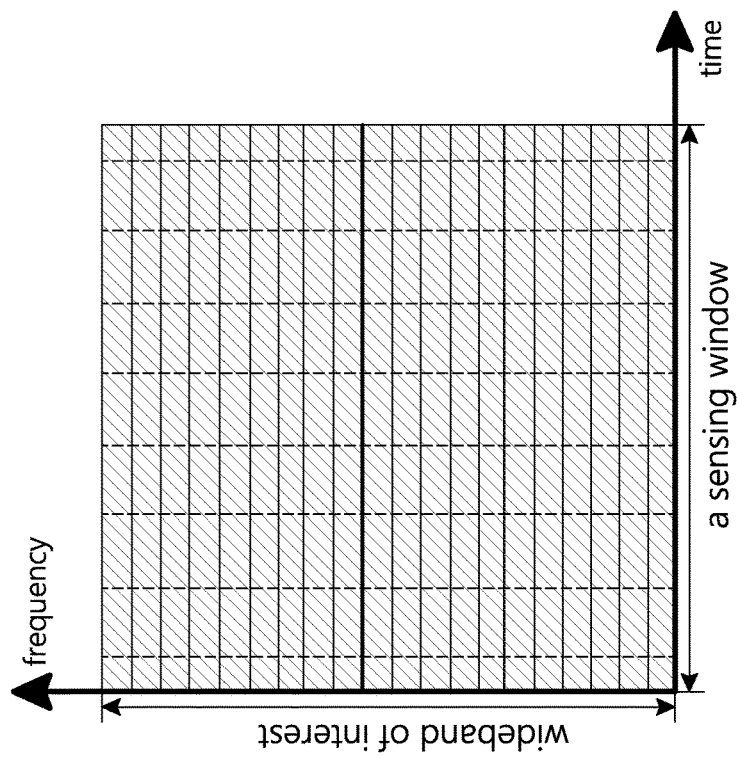
FIGS. 5A and 5B schematically illustrate some differences between sequential narrowband Nyquist sampling (SNNS) and integer undersampling (IU) in the time-frequency domain, respectively.
Figure 5A:
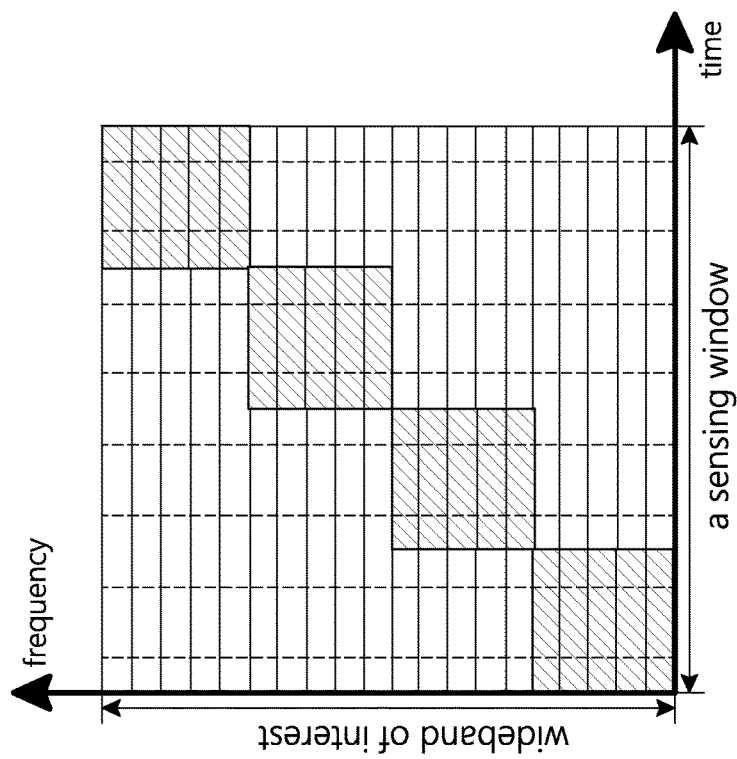

3) Integer Undersampling:

Sub-Nyquist sampling schemes, which sample the entire bandwidth all at once at an average sampling rate much lower than the wideband Nyquist rate, are often much easier to implement than PBNS or SNNS schemes. The simplest sub-Nyquist sampling scheme is to sample the wideband uniformly at a lower sampling rate than the wideband Nyquist rate. This disclosure describes an example of the uniform sub-Nyquist sampling scheme in which the sampling rate is an integer fraction of the wideband Nyquist rate. This approach is referred to as integer undersampling (IU). IU exhibits advantageous performance in the regime of better protections for the primary system. Certain differences between SNNS and IU in the time-frequency domain are schematically illustrated in FIGS. 5A (SNNS) and 5B (IU). An implementation of IU is shown in FIG. 4B.

Figure 6A:
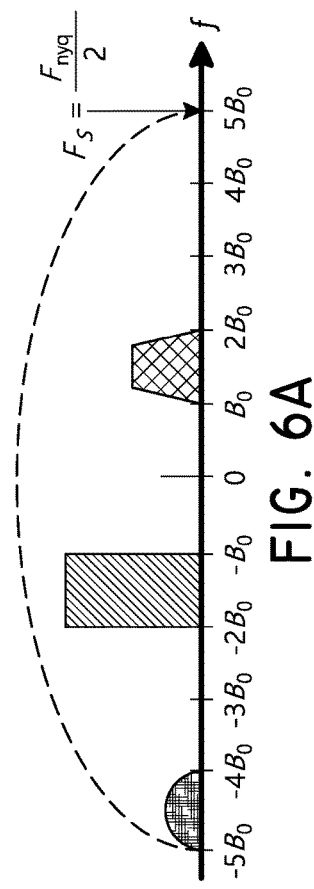
FIGS. 6A-6C schematically illustrate an example of aliasing that can occur when integer undersampling is utilized.
Figure 6B:
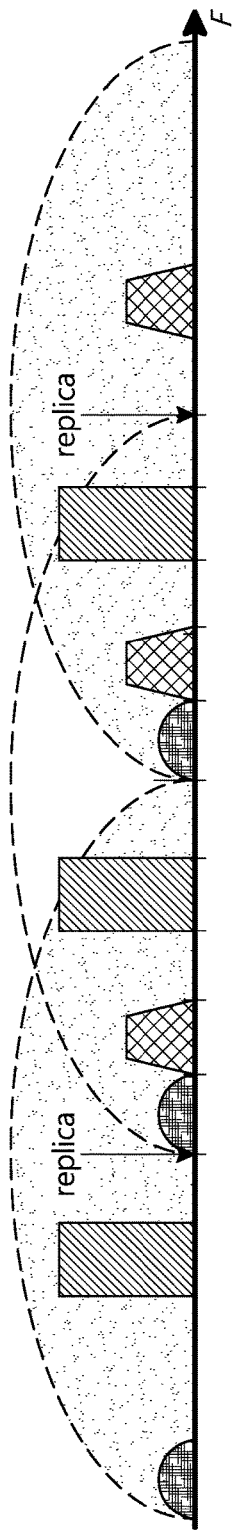
Figure 6C:
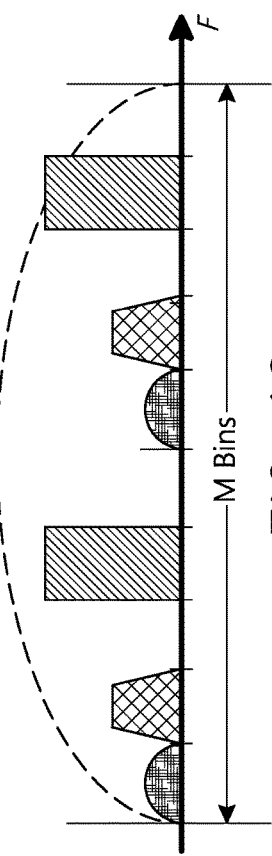

Sub-Nyquist sampling inherently causes aliasing in the frequency domain. Thus, a person of ordinary skill in the art would be discouraged from applying sub-Nyquist sampling techniques at least due to the aliasing issues it causes. However, as will be further described herein, sub-Nyquist sampling (and in many cases IU) provides clear advantages over Nyquist sampling techniques. For IU with a sub-sampling factor of $\rho$, the replicas caused by sampling can lead to complete overlap of frequencies $MB_0/\rho$ apart. The aliased "channels" due to sub-Nyquist sampling are referred to as bins, examples of which are illustrated in FIGS. 6A-6C. FIG. 6A is an example of a complex analog signal in the wideband of interest with 10 channels. FIG. 6B illustrates the aliasing effect of integer undersampling. FIG. 6C shows an example off the aliased signal, where each bin is a complete overlap of 2 channels. Note that for IU: each bin is a complete overlap of $\rho$ channels, and the M bins are periodic with period length $M/\rho$. Thus, the signals in the first $M/\rho$ bins are sufficient observations for spectrum sensing.

Other sub-Nyquist sampling schemes can be used such as, e.g., multi-coset sampling (also known as non-uniform periodic sampling), co-prime sampling, random sampling on a grid, or revised random sampling on a grid with fixed number of active branches.

Example Performance Metrics

The detection performance for a single channel is often characterized by the pair $(P_M, P_F)$, where $P_M$ is the probability of missed detection and $P_F$ is the probability of false alarm. For multi-channel spectrum sensing, a possible extension of these performance metrics would be pair of vectors of individual probabilities of missed detection and individual probabilities of false alarm. However, a natural goal of the spectrum sensing in SUs is to find a sufficient amount of spectrum opportunities for secondary use.

1) Probability of Missed Detection and Probability of False Alarm:

We start our discussion by reviewing the probability of missed detection and the probability of false alarm for one channel, which are defined as $$P_{M,m}=Pr\{\hat{H}_m=0|H_m=1\}, \text{ and } P_{F,m}=Pr\{\hat{H}_m=1|H_m=0\},$$

respectively, where again $1 \leq m \leq M$ is the channel index. The detection probability is defined as the complement of the probability of missed detection, e.g., $P_{D,m}=1-P_{M,m}$. The probability of missed detection and the probability of false alarm are based on individual channels only. For symmetric channels with identical primary occupancy probability and identical SNR level, $P_{M,m}$ and $P_{F,m}$ do not depend upon m.

2) Probability of Insufficient Spectrum Opportunity and Probability of Excessive Interference Opportunity:

Consider the case in which the goal of wideband spectrum sensing for SU is to find a sufficient number of spectrum opportunities under certain constraints on primary protection. Let S denote the number of spectrum opportunities, e.g., the number of identified OFF channels. Let $S_d$ denote the target number of spectrum opportunities for the SU. The probability of insufficient spectrum opportunity (ISO) can be defined as the probability that the number of spectrum opportunities falls below the desired level $S_d$, e.g., $$P_{ISO}=Pr\{S<S_d\}.$$

For one SU, a natural choice of the desired number of spectrum opportunities could be $S_d=1$, e.g., the SU requires at least one spectrum opportunity to make its transmission. Wider bandwidth transmissions and/or multiple SU transmissions can be captured by $S_d>1$.

If an ON channel is declared to be OFF, it leads to an interference opportunity since the SU may decide to transmit upon the decision. Thus, let I denote the number of interference opportunities, e.g., the number of missed ON channels. For the purpose of reducing or minimizing the possible interference to the PUs, a maximum target number of interference opportunities, denoted by $I_d$, is imposed by the primary system. The probability of excessive interference opportunity (EIO) can be defined as the probability that the number of interference opportunities is greater than the desired level $I_d$, e.g., $$P_{EIO}=Pr\{I>I_d\}.$$

One example of the target number of interference opportunities is $I_d=0$, i.e., no interference opportunity to any channel is desired by the primary system. $P_{ISO}$ and $P_{EIO}$ correspond to a broader range of performance metrics for wideband spectrum sensing. Representations of $P_{ISO}$ and $P_{EIO}$ in terms of a probability mass function (PMF) of spectrum opportunities and the number of interference opportunities are provided in the '118 Application.

Note that both pairs of performance metrics, $(P_M, P_F)$, and $(P_{ISO}, P_{EIO})$, are general performance metrics independent of the sampling schemes and the detection algorithms used in a CR system. Yet there are two major differences between the two pairs of performance metrics: $P_{M,m}$ and $P_{F,m}$ are defined conditionally on the real states of channels, while $P_{ISO}$ and $P_{EIO}$ are defined unconditionally; and $P_{M,m}$ and $P_{F,m}$ are constant performance metrics across symmetric channels, while $P_{ISO}$ and $P_{EIO}$ are performance metrics for the entire bandwidth, which inherently introduce coupling across channels.

Specifically, if we consider one channel only, i.e., M=1, $S_d=1$ and $I_d=0$, the relationship between these two pairs of performance metrics are $$P_{ISO}=p+(1-p)P_F, \text{ and } P_{EIO}=pP_M.$$

3) Joint Design of Sampling Schemes and Detection Algorithms for Wideband Spectrum Sensing:

Including the performance metrics discussed above, the dependencies across channels for wideband spectrum sensing lie in four aspects as listed in the following table with illustrative examples for each case.

| Dependencies/coupling across channels | | |
|---|---|---|
| | Independent | Dependent |
| Primary occupancies | p-sparse | K-sparse |
| Performance metrics | $(P_M, P_F)$ | $(P_{ISO}, P_{EIO})$ |
| Sampling schemes | Nyquist sampling | sub-Nyquist sampling |
| Detection algorithms | channel-by-channel detection | multi-channel detection |

For the simplest case in which the first three aspects are all independent across channels, channel-by-channel detection gives the optimal performance. For all other cases, the detection algorithms and the sampling schemes can be designed jointly for the specific performance metrics. Thus, for performance metrics that couple individual channels, such as $P_{ISO}$ and $P_{EIO}$, it is anticipated that channel-by-channel detection may not be optimal for wideband Nyquist sampling, and multi-channel detection algorithms can be designed in accordance with the performance metrics.

Example Channel Detection Algorithms

Nyquist sampling, whether it is narrowband, partial-band, or wideband, gives independent observations across channels since no signal aliasing in frequency is introduced, and channel-by-channel detection can be easily implemented. However, for $P_{ISO}$ and $P_{EIO}$ that couple individual channels, multi-channel detection algorithms are expected to perform better than the channel-by-channel detection. Several examples of multi-channel detection algorithms are described, primarily based on PBNS with parameter L. Results for WBNS and SNNS can be determined from PBNS with different parameter settings.

Various detection schemes described herein can be referred to as direct-decision-making detection schemes. In such schemes, the auto-correlation sequence, or equivalently, the power spectral density (PSD) of the primary signal is directly estimated without any attempts of signal reconstruction under the assumption that the number of active PUs is fixed and known.

A. Independent Channel-by-Channel Detection

Channel-by-channel detection makes decisions on each channel independently based upon a detection statistic, for example, the average signal energy. Non-coherent energy detection is implemented in some cases. A test statistic $T_m$ of channel m is the average energy of all samples in the channel, for $1 \leq m \leq L$. The SU sensing decision for the m-th channel is ON, if the test statistic is greater than or equal to a threshold, $\tau$, and the sensing decision for the m-th channel is OFF, if the test statistic is less than the threshold, $\tau$. Since no real-world observations are available for any channel with an index greater than L, the SU simply assumes those channels are always unavailable, or equivalently, always declares those channels to be ON. In other embodiments, the test statistic $T_m$ can be based on the PSD of the signal, for example, as computed by the Lomb-Scargle periodogram.

In some embodiments, the detection threshold τ can be determined by cost factors under a Bayesian detection framework that reduces or minimizes the detection risk, or by the desired false alarm rate under the constant false alarm rate (CFAR) detection framework. The Bayesian detection framework can be based on cost factors relating to probabilities for insufficient spectrum opportunity and excessive interference opportunity. The detection threshold can be based at least partly on the primary occupancy probability, the SNR, the number of samples per channel, and the cost ratio. By varying the detection threshold, the receiver operating characteristic (ROC) can be determined. Additional details and formulas for calculating the probabilities $P_M$, $P_F$, $P_{ISO}$, and $P_{EIO}$ are provided in the '118 Application.

B. Ranked Channel Detection (RCD)

Channel-by-channel detection may be optimal in minimizing the detection risk per channel if the primary occupancies and the secondary observations are independent across channels. If the detection performance metrics are $P_{ISO}$, and $P_{EIO}$, channel-by-channel detection is no longer optimal. Multi-channel detection makes decisions across channels jointly. When the performance metrics $P_{ISO}$, and $P_{EIO}$ are utilized, a ranked channel detection (RCD) algorithm using a detection threshold τ can be used for channel detection. The RCD algorithm makes decisions by comparing channels in the partial-band.

It is advantageous if the detection algorithm first chooses channels with larger a posteriori probabilities of being in the OFF state as candidates for spectrum opportunities. This energy-based RCD approach is based on the concept that smaller energy in a channel implies high posterior belief of the channel being in an OFF state, for symmetric channels with equal noise and primary signal power levels. In one implementation of RCD, the channels are sorted in ascending order with regard to the test statistic $T_m$. Decisions are made for the first $L_d$ channels, where $S_d \leq L_d \leq L$, using energy detection with the given detection threshold τ. The remaining $M-L_d$ channels are ignored.

Note that $L_d$ is a parameter that controls the number of channels on which the detector would make decisions based upon the real-world observations. This ranked channel detection algorithm separates the number of monitored channels and the number of channels on which to make sensing decisions.

In another embodiment, the goal is to find a total number of $S_d$ spectrum opportunities restricted to no interference opportunities to the primary system, i.e., $I_d=0$. In this embodiment, all channels are initially declared to be ON. In each round, one OFF channel is added to a candidate channel set that has the largest posterior belief of being in an off state. A Bayesian decision rule can be used as described in the '118 Application. Each newly added channel leads to potential increase in both the number of spectrum opportunities and the excessive interference opportunity, and affects the detection risk correspondingly. Once all M channels are added to the candidate channel set, the number of declared OFF channels is chosen to minimize the detection risk and the corresponding number of channels is actually declared OFF.

It has been found that certain embodiments of ranked channel detection can outperform channel-by-channel detection in terms of ($P_{ISO}$, and $P_{EIO}$).

(i) Application to Undersampling

In certain embodiments sub-Nyquist sampling, the undersampling can lead to aliasing in which the wideband spectrum is divided into bins, with multiple aliased channels included in each bin. For example, with IU a sub-sampling factor of ρ, each bin is a periodic aliasing of ρ channels, the bins are periodic with length M/ρ, and channels in a bin may be indistinguishable from the observations. In certain such embodiments, the RCD approach can be performed to rank bins (rather than to rank channels). For example, if the bin energy level is above the threshold, the bin is ON, and if the bin energy level is lower than the threshold, the bin is OFF.

For the different channels in any bin, in some embodiments, the same detection decision is made for all channels in the bin (e.g., all channels are ON or all channels are OFF). In other embodiments, a stochastic channel detection algorithm can be applied so that different detection decisions can be made for different channels in a bin. For example, each channel in a bin can be declared to be ON based on an alarm probability that is a function of the bin power. In some cases, the alarm probability is set to zero if the bin power is less than the threshold, and the alarm probability is set to one if the bin power exceeds the threshold.

C. Comparison of Channel-by-Channel Detection with Ranked Channel Detection (RCD)

Theoretical calculations and numerical simulations comparing the detection performance of different sampling schemes, e.g., partial-band Nyquist sampling (PBNS), sequential narrowband Nyquist sampling (SNNS), and integer undersampling (IU), using different detection algorithms, e.g., channel-by-channel detection and ranked channel detection, in terms of ($P_M$, and $P_F$) as well as ($P_{ISO}$, and $P_{EIO}$) have been performed. Details regarding these calculations and simulations are provided in the '118 Application, and results and conclusions are described below.

1. Example Results for Channel-by-Channel Detection.

First, for moderate and high SNR (e.g., SNR>10 dB), IU achieves better performance for small $P_M$ and high $P_F$, which corresponds to a regime of interest since small $P_M$ is often preferable for the sake of protecting the primary system. Moreover, wideband spectrum sensing is likely to tolerate higher $P_F$ than single channel sensing, since there is still reasonable chance to find a fair amount of OFF channels even with high $P_F$.

Second, for low SNR (e.g., SNR≤0 dB), certain implementations of IU may be much worse than SNNS. Note that we use SNR=0 dB as an illustrative example while similar results can be observed for even lower SNR levels.

Third, the lower the primary occupancy probability, the better that IU can perform. This is reasonable since high primary occupancy probability leads to more ON channels, thus more primary signal aliasing for IU. On the contrary, the results for WBNS and SNNS are independent of the primary occupancy status, since the channels are not coupled.

Finally, as the sub-sampling factor increases, the detection performances for IU and SNNS both degenerate, since greater sub-sampling factor means more aliasing in the signal for IU, and less number of samples per channel for SNNS.

With certain embodiments of independent channel-by-channel detection, it may not always be advantageous to sample at a higher sampling rate. For example, PBNS with the least number of channels in the partial-band performs best in its achievable regime for the case that satisfies the following conditions concurrently: (a) small primary occupancy probability, (b) small number of samples per channel, and (c) small SNR levels.

One possible reason is that as the number of channels is increased in PBNS, the possibilities of finding more spectrum opportunity and more interference opportunity increase at the same time, and because the sensing window is not sufficiently long, the amount of increased interference opportunities overwhelms the amount of increased spectrum opportunities, thus leading to worse overall performance for increased number of channels in the partial-band. Some results indicate that the observations in the partial-band are not efficiently utilized.

2. Example Results for Ranked Channel Detection.

By using the ranked channel detection algorithm, the sensing performance improves with increasing number of channels in the partial-band as a result of diversity across channels. Analogous observations can be made for different SNR levels, primary occupancy probabilities, the desired number of spectrum opportunities, and the desired of number of interference opportunities. The results suggest that for performance metrics that couple individual channels, multichannel detection algorithms should be designed properly to better match those performance metrics, even with conditionally independent observations.

Comparisons of $P_{ISO}$ and $P_{EIO}$ of PBNS, SNNS and IU for the same sampling rate indicate the following. If the desired number of spectrum opportunities is relatively large (e.g., $S_d=L/2$ in this case), IU achieves better performance than PBNS in the regime of better protection for the primary system. On the contrary, PBNS shows better performance only for very small desired number of spectrum opportunities. However, if the desired number of spectrum opportunities is too small, (e.g., 1 opportunity), there is really no need to scan the entire bandwidth. Thus, IU can achieve better sensing performance in the regime of interest for moderate or large desired number of spectrum opportunities. On the other hand, SNNS performs worse than PBNS for the regimes that have been examined.

The results indicate that for performance metrics that do not couple individual channels, channel-by-channel detection typically is optimal. However, for performance metrics that couple individual channels, ranked channel detection algorithms can achieve better performance. Moreover, integer undersampling, which corresponds to the simplest sub-Nyquist sampling scheme, exhibits appealing detection performance in the regime of better protection for the primary system for most of the cases examined. Co-prime sampling can achieve similar sensing performance to random sampling (for the same performance metrics and detection algorithms) but is generally much easier to implement practically.

The sampling and detection schemes described herein are not limited to the particular examples disclosed but can also be applicable to cooperative wideband sensing, in which multiple secondary users cooperate in detecting the existence of the primary users in a wideband, and other system models with different channel bandwidths, different SNR levels across channels, fading, etc.

Example Methods for Sub-Nyquist Wideband Spectrum Sensing

Figure 7:
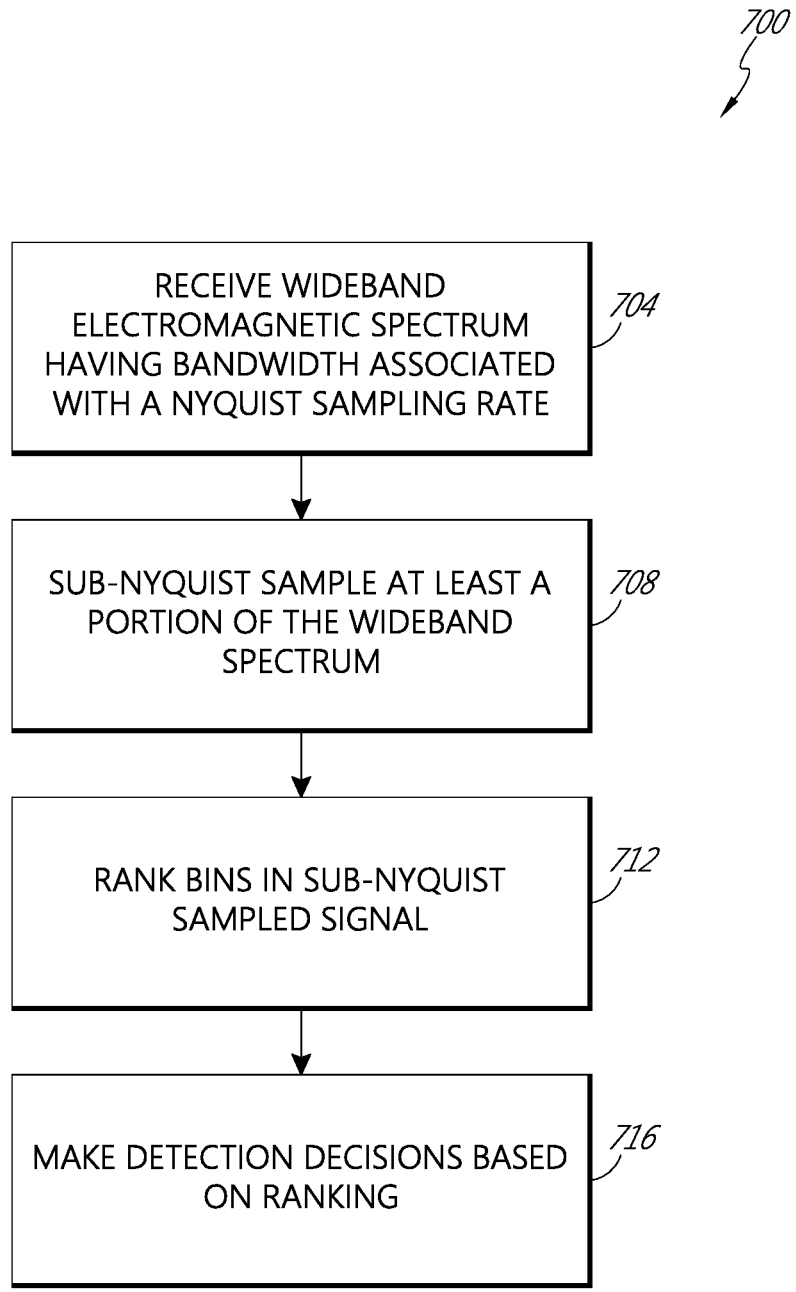
FIG. 7 is a flowchart illustrating an example of a method for sub-Nyquist sampling a wideband spectrum and making detection decisions for unused channels.

FIG. 7 is a flowchart illustrating an example of a method 700 for sub-Nyquist sampling a wideband spectrum and making detection decisions for unused channels. The method 700 can be performed by the hardware system 200 described with reference to FIG. 2. As described above, a third party, such as a control authority, can perform embodiments of the method 700 itself or the sensing observations of multiple SUs can be transmitted to and compiled by the control authority.

At block 704, the method 700 receives an electromagnetic signal having a wideband spectrum. The wideband spectrum has a bandwidth that is associated with a corresponding Nyquist sampling rate. At block 708, the signal is sampled at a sub-Nyquist rate. For example, undersampling can be performed with a sub-sampling factor ρ greater than one. As described herein, the sub-sampling factor can be an integer. In various implementations, the sub-sampling factor is greater than 2, greater than 5, greater than 10, or greater than 20. The sub-sampling factor may be in a range from 2 to 25, a range from 2 to 10, a range from 5 to 20, or some other range. Due to aliasing, the sub-Nyquist sampled signal includes a plurality of bins that each comprise a plurality of channels. For example, for a sub-sampling factor ρ, each bin comprises ρ aliased channels.

In the example shown in FIG. 7, a ranked channel detection scheme is performed to make the detection decisions. The ranked channel detection may be based at least in part on a target operating point that is based at least in part on a probability of excessive interference opportunities and a probability of insufficient spectrum opportunities. For example, at block 712, the bins can be ranked based on a test statistic. For example, the test statistic $T_m$ of bin m can be the average energy of all samples in the bin. At block 716, detection decisions can be made on the ranked bins. For example, the detection decision for the m-th bin is ON, if the test statistic is greater than or equal to a threshold, τ, and the detection decision for the m-th bin is OFF, if the test statistic is less than the threshold, τ. The threshold can be based at least partly on the target operating point. As described herein, in some implementations, all channels in a bin have the same detection decision, and in other implementations, a stochastic channel detection decision can be made for each bin based on an alarm probability. The hardware system 200 can broadcast in channels that are determined to be OFF. Accordingly, the method 700 can provide an efficient way to identify spectrum opportunities, using sub-Nyquist sampling, without complete reconstruction of the wideband spectrum.

Figure 8:
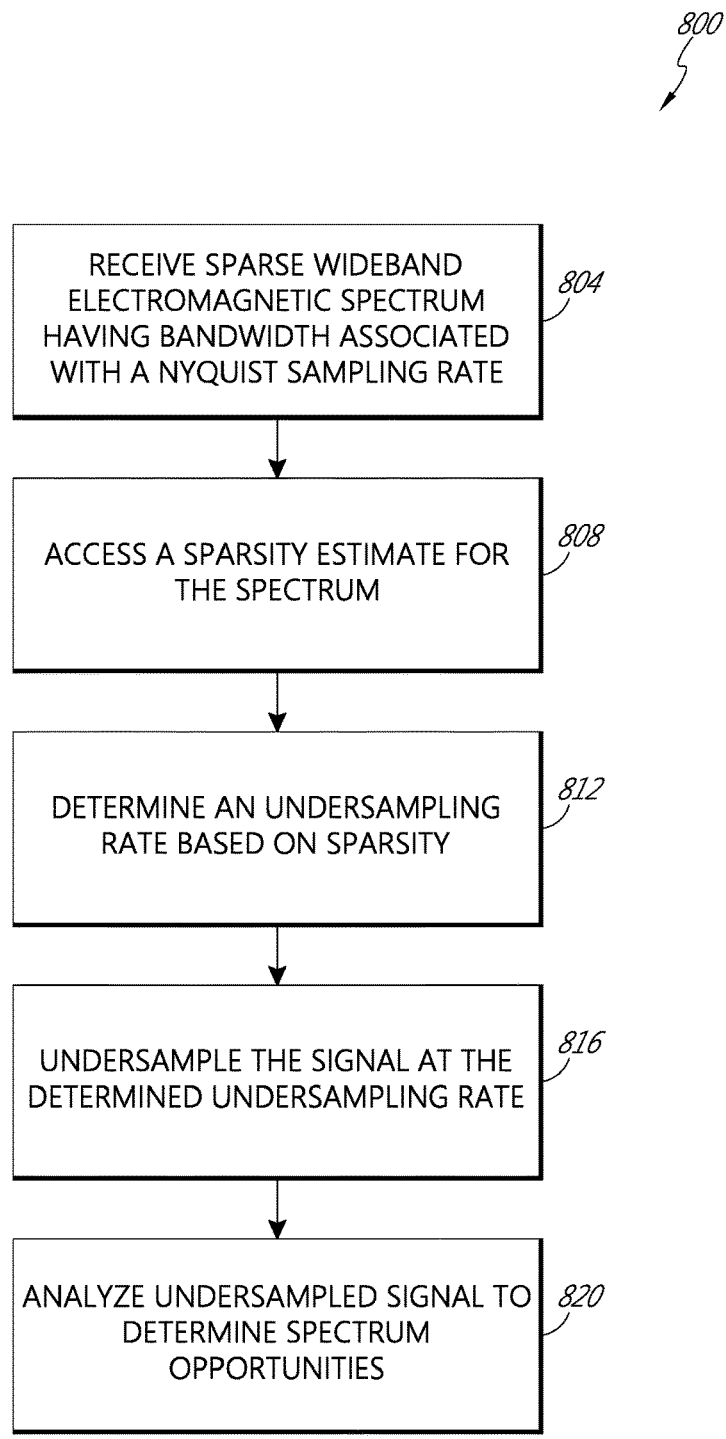
FIG. 8 is a flowchart illustrating an example of a method for dynamically sampling a sparse wideband spectrum.

FIG. 8 is a flowchart illustrating an example of a method 800 for dynamically sampling a sparse wideband spectrum. The method 800 can be performed by the hardware system 200 described with reference to FIG. 2. As described above, a third party, such as a control authority, can perform embodiments of the method 800 itself or the sensing observations of multiple SUs can be transmitted to and compiled by the control authority.

At block 804, the method 800 receives an electromagnetic signal having a wideband spectrum. The wideband spectrum has a bandwidth that is associated with a corresponding Nyquist sampling rate. The wideband spectrum is sparse, e.g., with only a small fraction of the spectrum being utilized by its licensed user. The sparsity can be measured, for example, based on a primary occupancy probability, p, as described above. At block 808, the method 800 accesses a sparsity estimate for the spectrum. The sparsity estimate may be based on the primary occupancy probability. The sparsity estimate may be based at least in part an energy statistic for at least some of the channels (or bins) in the spectrum. At block 812, the method determines an undersampling rate based at least in part on the sparsity. For example, as the primary occupancy probability increases, the sparsity of the spectrum decreases (e.g., there are fewer spectrum opportunities), and the undersampling rate may increase towards the Nyquist rate, in order to have a reasonable likelihood of finding the spectrum opportunities. In contrast, as the primary occupancy probability decreases, the sparsity of the spectrum increases (e.g., there are more spectrum opportunities), and the undersampling rate may decrease further below the Nyquist rate, since it is relatively easier to find the (more abundant) spectrum opportunities in a very sparse spectrum. For example, in the case of a sub-sampling factor ρ (where the sampling rate is the Nyquist rate divided by ρ>1), the sub-sampling factor ρ can increase as the spectrum becomes more sparse (e.g., more spectrum opportunities), and the sub-sampling factor ρ can decrease as the spectrum becomes less sparse (e.g., fewer spectrum opportunities).

At block 816, the method 800 undersamples the signal at the determined undersampling rate. The hardware system 200 can comprise a tunable data converter or a bank of filters having different bandwidths. For example, the I/O devices and interfaces circuitry 210 can include ρ analog passband filters, or one analog passband filter along with a tunable mixer. The CPU 205 can command the I/O devices and interfaces circuitry 210 to perform the undersampling with the determined sub-sampling rate ρ. At block 820, the undersampled signal can be analyzed to identify spectrum opportunities. In various implementations, the method 800 can utilize ranked channel detection techniques to identify spectrum opportunities.

CONCLUSION

Each of the processes, methods, and algorithms described herein and/or depicted in the attached figures may be embodied in, and fully or partially automated by, code modules, comprising executable instructions stored in a memory, executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A spectrum sensing system for dynamically undersampling a sparse electromagnetic spectrum, the system comprising:
   an antenna configured to receive electromagnetic signals in a spectrum having a total bandwidth, B, and a number of channels, M, the total bandwidth associated with a Nyquist sampling rate, Nyq;
   a sampling system in communication with the antenna, the sampling system capable of sampling the electromagnetic signals in the spectrum at a plurality of different undersampling rates, wherein each of the undersampling rates in the plurality of undersampling rates is less than the Nyquist sampling rate;
   a hardware processor in communication with the sampling system, the processor programmed to:
   access an estimate of a sparsity of the spectrum;
   determine, based at least in part on the sparsity, an undersampling rate; and
   command the sampling system to sample the electromagnetic signals in the spectrum at the determined undersampling rate to provide an undersampled signal; and
   perform ranked channel detection (RCD) on the undersampled signal, wherein the ranked channel detection is based at least in part on a target operating point that is based at least in part on a probability of excessive interference opportunities ($P_{EIO}$) and a probability of insufficient spectrum opportunities ($P_{ISO}$), wherein
   $P_{ISO}$ and $P_{EIO}$ are performance metrics for the total bandwidth B that introduce coupling across the number of channels M,
   $P_{EIO}$ is a probability that a number of interference opportunities is greater than a maximum target number of interference opportunities, and
   $P_{ISO}$ is a probability that a number of spectrum opportunities falls below a target number of spectrum opportunities.

2. The spectrum sensing system of claim 1, wherein the hardware processor is further programmed to determine the estimate of the sparsity of the spectrum based at least in part on an energy statistic for at least some of the channels in the spectrum.

3. The spectrum sensing system of claim 1, wherein the hardware processor is further programmed to determine the estimate of the sparsity of the spectrum based at least in part on a primary occupancy probability.

4. The spectrum sensing system of claim 1, wherein the processor is further programmed to analyze the undersampled signal to determine presence of a spectrum opportunity in the spectrum.

5. The spectrum sensing system of claim 1, wherein the processor is programmed to dynamically update the determined undersampling rate based at least in part on changes to the estimated sparsity of the spectrum.

6. A method for dynamically undersampling a sparse electromagnetic spectrum, the method comprising:
   under control of a spectrum sensing system comprising computer hardware:
   receiving electromagnetic signals in a spectrum having a total bandwidth, B, and a number of channels, M, the total bandwidth associated with a Nyquist sampling rate, Nyq;
   sampling the electromagnetic signals in the spectrum at a plurality of different undersampling rates, wherein each of the undersampling rates in the plurality of undersampling rates is less than the Nyquist sampling rate;
   accessing an estimate of a sparsity of the spectrum;
   determining, based at least in part on the sparsity, an undersampling rate; and
   sampling the electromagnetic signals in the spectrum at the determined undersampling rate to provide an undersampled signal
   performing ranked channel detection (RCD) on the undersampled signal, wherein the ranked channel detection is based at least in part on a target operating point that is based at least in part on a probability of excessive interference opportunities ($P_{EIO}$) and a probability of insufficient spectrum opportunities ($P_{ISO}$), wherein $P_{ISO}$ and $P_{EIO}$ are performance metrics for the total bandwidth B that introduce coupling across the number of channels M, $P_{EIO}$ is a probability that a number of interference opportunities is greater than a maximum target number of interference opportunities, and $P_{ISO}$ is a probability that a number of spectrum opportunities falls below a target number of spectrum opportunities.

7. The method of claim 6, further comprising analyzing the undersampled signal to determine presence of a spectrum opportunity in the spectrum.

8. The method of claim 6, further comprising dynamically updating the determined undersampling rate based at least in part on changes to the estimated sparsity of the spectrum.

9. The spectrum sensing system of claim 1, wherein:

the plurality of different undersampling rates comprises a plurality of integer undersampling rates, and the sampling system is configured to sample the total bandwidth B of the spectrum uniformly at a single integer undersampling rate, wherein the undersampled signal comprises an integer undersampled signal based on the single integer undersampling rate.

10. The method of claim 6, wherein:

the plurality of different undersampling rates comprises a plurality of integer undersampling rates, and sampling the electromagnetic signals comprises sampling the total bandwidth B of the spectrum uniformly at a single integer undersampling rate, wherein the undersampled signal comprises an integer undersampled signal based on the single integer undersampling rate.

* * * * *